(12) United States Patent
Hsieh et al.

(10) Patent No.: US 11,373,570 B2
(45) Date of Patent: Jun. 28, 2022

(54) GATE LINE BREAK DISPLAYS

(71) Applicant: Hewlett-Packard Development Company, L.P., Spring, TX (US)

(72) Inventors: Hsing-Hung Hsieh, Taipei (TW); Cheng-Hua Yu, Taipei (TW); Mario E. Campos, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 72 days.

(21) Appl. No.: 16/650,006

(22) PCT Filed: Dec. 14, 2017

(86) PCT No.: PCT/US2017/066282
§ 371 (c)(1),
(2) Date: Mar. 24, 2020

(87) PCT Pub. No.: WO2019/117906
PCT Pub. Date: Jun. 20, 2019

(65) Prior Publication Data
US 2021/0375174 A1    Dec. 2, 2021

(51) Int. Cl.
*G09G 3/20* (2006.01)
(52) U.S. Cl.
CPC ....... *G09G 3/20* (2013.01); *G09G 2310/0221* (2013.01)
(58) Field of Classification Search
None
See application file for complete search history.

(56) References Cited

U.S. PATENT DOCUMENTS

| | | | |
|---|---|---|---|
| 8,595,782 B2 | 11/2013 | Sie et al. | |
| 8,599,314 B2 | 12/2013 | Ozaki et al. | |
| 9,418,588 B2 | 8/2016 | Ryu et al. | |
| 9,619,197 B2 | 4/2017 | Bang et al. | |
| 2012/0140160 A1* | 6/2012 | Han | G02F 1/13336 349/144 |
| 2013/0265340 A1* | 10/2013 | Ahn | G09G 3/3607 345/690 |
| 2013/0286287 A1* | 10/2013 | Fujiwara | G09G 3/20 348/564 |
| 2015/0243212 A1* | 8/2015 | Lee | G09G 3/3216 345/212 |
| 2016/0343291 A1* | 11/2016 | Wang | H01L 27/124 |
| 2017/0076683 A1 | 3/2017 | Lee et al. | |

FOREIGN PATENT DOCUMENTS

KR    20130062011 A    6/2013

OTHER PUBLICATIONS

Adapt an Experience for Different Display Sizes and Aspect Ratios, http://support.intuilab.com/kb/how-to/adapt-an-experience-for-different-display-sizes-and-aspect-rat ios.

* cited by examiner

*Primary Examiner* — Aneeta Yodichkas
(74) *Attorney, Agent, or Firm* — Brooks Cameron & Huebsch PLLC

(57) ABSTRACT

In one example, a display device can include a gate line break across a plurality of gate lines, a first source driver positioned on a first side of the gate line break, a first gate driver positioned on the first side of the gate line break, a second source driver positioned on a second side of the gate line break, and a second gate driver positioned on the second side of the gate line break.

14 Claims, 3 Drawing Sheets

GATE LINE BREAK DISPLAYS

BACKGROUND

Computing devices can utilize a user interface to display text documents and image documents. The computing devices can utilize different aspect ratios for displaying the text documents and/or image documents. The aspect ratio can be a ratio of the width to the height of a display or user interface of the computing device.

DETAILED DESCRIPTION

Figure 1:
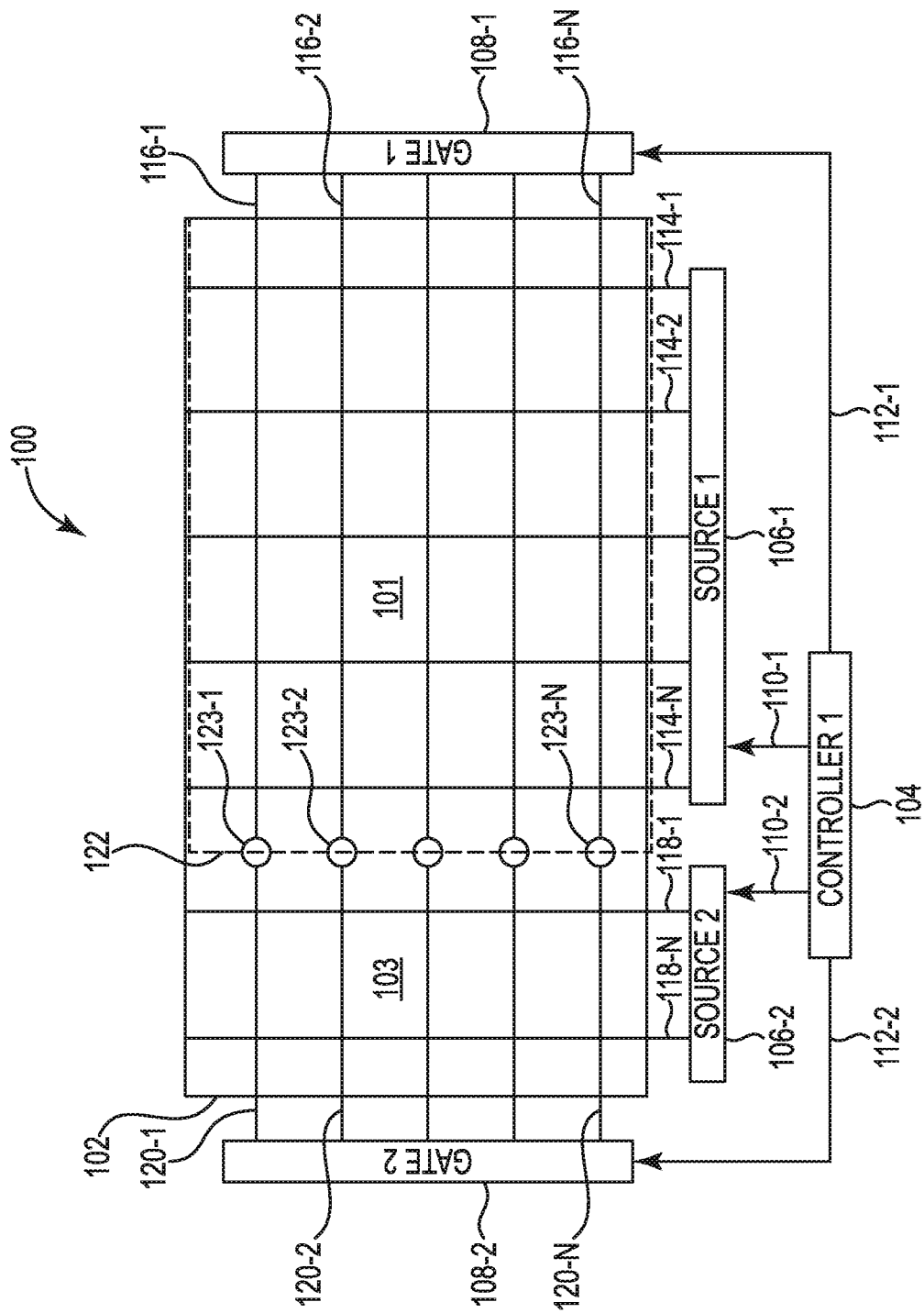
FIG. 1 illustrates an example of a system for a gate line break display consistent with the present disclosure.

A number of systems, devices, and methods for gate line break displays or displays that utilize a gate line break are described herein. In some examples, a display device can include a gate line break across a plurality of gate lines, a first source driver positioned on a first side of the gate line break, a first gate driver positioned on the first side of the gate line break, a second source driver positioned on a second side of the gate line break, and a second gate driver positioned on the second side of the gate line break. In some examples, a particular application, video, text document, and/or image documents can be displayed with a relatively higher image quality when the user interface or display is utilizing a particular aspect ratio. In some examples, the aspect ratio of the display can be altered at the gate line break from a first aspect ratio that includes the first side and the second side of the gate line break to an aspect ratio that includes either the first side of the gate line break or the second side of the gate line break.

In some examples, the gate line break displays described herein can include a single display with a disconnected portion of a gate line between a first source line and a second source line. For example, the disconnected portion of the gate line can prevent a signal from crossing the gate line break of the display. As used herein, a gate line break includes a plurality of break points of a gate line between a first source line and a second source line. As used herein, a break point includes a point on a gate line that includes one of: an electrical open point or disconnected portion that prevents a signal to pass through the break point, a switch that can be open to prevent a signal to pass through the switch or closed to allow a signal to pass through the switch, and/or a transistor that can be utilized to either prevent or allow a signal to pass through the transistor. That is, in some examples, the break point can include a switch to prevent or allow a signal to pass through the break point or the break point can include an open portion or disconnected portion without a switch to prevent a signal from passing through the break point. Thus, in some examples, the break point can be a location where a gate line is permanently disconnected or semi-permanently disconnected with a switch.

In some examples, the gate line break can include switch at the gate line between a first source line and a second source line. For example, the gate line break can include a plurality of switches at the gate lines between a first source line and a second line. In this example, the plurality of switches between the first source line and the second source line can be closed to complete a connection between the first side and the second side of the gate line break. Furthermore, in this example, the plurality of switches between the first source line and the second source line can be open to disconnect a connection between the first side and the second side of the gate line break.

In some examples, the gate line break can separate the display into multiple sections to alter an aspect ratio of the display. In some examples, the gate line break can be utilized to split the display into a first side and a second side. In these examples, the first side of the display can be utilized to generate a first image or visual representation and the second side can be utilized to generate a second image or visual representation. In this way the gate line break displays described herein can be a single display that can be split into multiple sections and/or alter an aspect ratio by utilizing a gate line break as described herein.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a system 100 for a gate line break display consistent with the present disclosure. The system 100 can include a display 102. As used herein, a display 102 can be an electronic device that can provide a visual representation of data. For example, the display 102 can be a television and/or monitor of a computing device that can project an image or video representation of data.

In some examples, the system 100 can include a controller 104. In some examples, the controller 104 can be utilized to provide instructions to a gate driver 108-1, 108-2 and/or a source driver 106-1, 106-2. For example, the controller 104 can provide instructions to the gate driver 108-1, 108-2 that define a signal to be provided to each of a plurality of gate lines 116-1, 116-2, 116-N, 120-1, 120-2, 120-N coupled to the gate driver 108-1, 108-2. In another example, the controller 104 can provide instructions to the source driver 106-1, 106-2 that define a signal to be proved to each of a plurality of source lines 114-1, 114-2, 114-N, 118-1, 118-N coupled to the source driver 106-1, 106-2.

As used herein, a controller 104 can include a computing device or logic that can include a processing resource and instructions that are executable by the processing resource. A processing resource may be a central processing unit (CPU), microprocessor, and/or other hardware device suitable for retrieval and execution of instructions stored in a machine readable storage medium. In some examples, the processing resource can be coupled to the machine readable storage medium via a connection. The connection can be a physical or wireless communication connection. In some examples, the processing resource may receive, determine, and send instructions. As an alternative or in addition to retrieving and executing instructions, the processing resource may include an electronic circuit comprising a number of electronic components for performing the operations of the instructions in the machine readable storage medium.

A machine readable storage medium may be any electronic, magnetic, optical, or other physical storage device that stores executable instructions. Thus, the machine readable storage medium may be, for example, Random Access Memory (RAM), an Electrically-Erasable programmable Read-Only Memory (EEPROM), a storage drive, an optical disc, and the like. The executable instructions may be stored on the machine readable storage medium. Machine readable storage medium may be a portable, external or remote storage medium, for example, that allows the system to download the instructions from the portable/external/remote storage medium. In this situation, the executable instructions may be part of an "installation package". As described herein, machine readable storage medium may be encoded with executable instructions for remote device configurations as described herein.

In some examples, the plurality of gate lines 116-1, 116-2, 116-N, 120-1, 120-2, 120-N can intersect the plurality of source lines 114-1, 114-2, 114-N, 118-1, 118-N at a plurality of corresponding pixels. In some examples, a first signal can be provided by a gate line of the plurality of gate lines 116-1, 116-2, 116-N, 120-1, 120-2, 120-N and a second signal can be provided by a source line of the plurality of source lines 114-1, 114-2, 114-N, 118-1, 118-N. In these examples, the combined signal of the gate line and the source line can indicate a color and/or a brightness of the corresponding pixel. For example, the signal provided to gate line 116-1 by the gate driver 108-1 can intersect the signal provided by the source driver 106-1 on the source line 114-1. In this example, the pixel at the intersection of the gate line 116-1 and the source line 114-1 can result in a color and/or brightness at the pixel.

In some examples, the controller 104 can be coupled to a first gate driver 108-1 via a connection 112-1 and can be coupled to a second gate driver 108-2 via a connection 112-2. In some examples, the first gate driver 108-1 can be coupled to a first plurality of gate lines 116-1, 116-2, 116-N. The second gate driver 108-2 can be coupled to a second plurality of gate lines 120-1, 120-2, 120-N. As described herein, the first plurality of gate lines 116-1, 116-2, 116-N and the second plurality of gate lines 120-1, 120-2, 120-N can be continuous gate lines that are separated by the plurality of break points 123-1, 123-2, 123-N along the gate line break 122 when the gate lines 116-1, 116-2, 116-N, 120-1, 120-2, 120-N are positioned from a first end of the display 102 to the second end of the display 102. For example, the first plurality of gate lines 116-1, 116-2, 116-N can extend from a first end of the display 102 (e.g., right end as illustrated in FIG. 1) to the plurality of break points 123-1, 123-2, 123-N and the second plurality of gate lines 120-1, 120-2, 120-N can extend from a second end of the display 102 (e.g., left end as illustrated in FIG. 1) to the plurality of break points 123-1, 123-2, 123-N.

As described herein, the plurality of gate lines 116-1, 116-2, 116-N, 120-1, 120-2, 120-N can be split by a plurality of break points 123-1, 123-2, 123-N of a gate line break 122. For example, gate line 116-1 and gate line 120-1 can be split by a break point 123-1 of the gate line break 122. In some examples, the gate line break 122 can split the display 102 into a first side 101 and a second side 103. In some examples, the plurality of gate lines 116-1, 116-2, 116-N on the first side 101 can intersect the plurality of source lines 114-1, 114-2, 114-N on the first side 101 at a corresponding pixel of the first side 101 of the display 102. In some examples, the plurality of gate lines 120-1, 120-2, 120-N on the second side 103 can intersect the plurality of source lines 118-1, 118-N on the second side 103 at a corresponding pixel of the second side 103 of the display 102.

In some examples, the controller 104 can be coupled to a first source driver 106-1 via connection 110-1 and coupled to a first gate driver 108-1 via a connection 112-1 to control the first side 101 of the display 102. In some examples, the controller 104 can be coupled to a second source driver 106-2 via a connection 110-2 and coupled to a second gate driver 108-2 via a connection 112-2 to control the second side 103 of the display 102. In some examples, the controller 104 can alter an aspect ratio of the display 102 by activating or deactivating the second side 103 of the display 102. For example, the controller 104 can provide an aspect ratio of 16:9 when the second gate driver 108-2 and the second source driver 106-2 are activated and provide an aspect ratio of 3:2 when the second gate driver 108-2 and the second source driver 106-2 are deactivated. In this example, the gate line break 122 can be positioned between source line 118-1 and source line 114-N.

In some examples, the display 102 can include a continuous display surface. For example, the display 102 can include a continuous surface without an enclosure or other structure separating a first side 101 of the display 102 from a second side 103 of the display 102. In contrast, the display 102 can include a gate line break 122 that includes a plurality of break points 123-1, 123-2, . . . , 123-N. The gate line break 122 can split the display 102 into a first side 101 and a second side 103. For example, the gate line break 122 can include a separation of the gate lines.

In some examples, the controller 104 can split the display 102 into a first side 101 and a second side 102 to provide multiple displays within the display 102. For example, the first side 101 of the display 102 can be utilized as a first display and the second side 103 of the display 102 can be utilized as a second display. In this example, the first side 101 and the second side 103 of the display can be utilized as separate displays that can display separate windows, images, or text of a user interface.

In some examples, the first side 101 and the second side 103 of the display 102 be split and controlled separately as distinct displays without having a border between the first side 101 and the second side 103, For example, the display 102 can operate as a first display on the first side 101 and a second display on the second side 103 with a borderless presentation between the first side 101 and the second side 203. In this example, the display 102 can provide a better presentation across the first side 101 and the second side 103 than two separate displays and also provide separately controlled displays when the first side 101 and the second side 103 are used as separate displays.

Figure 2:
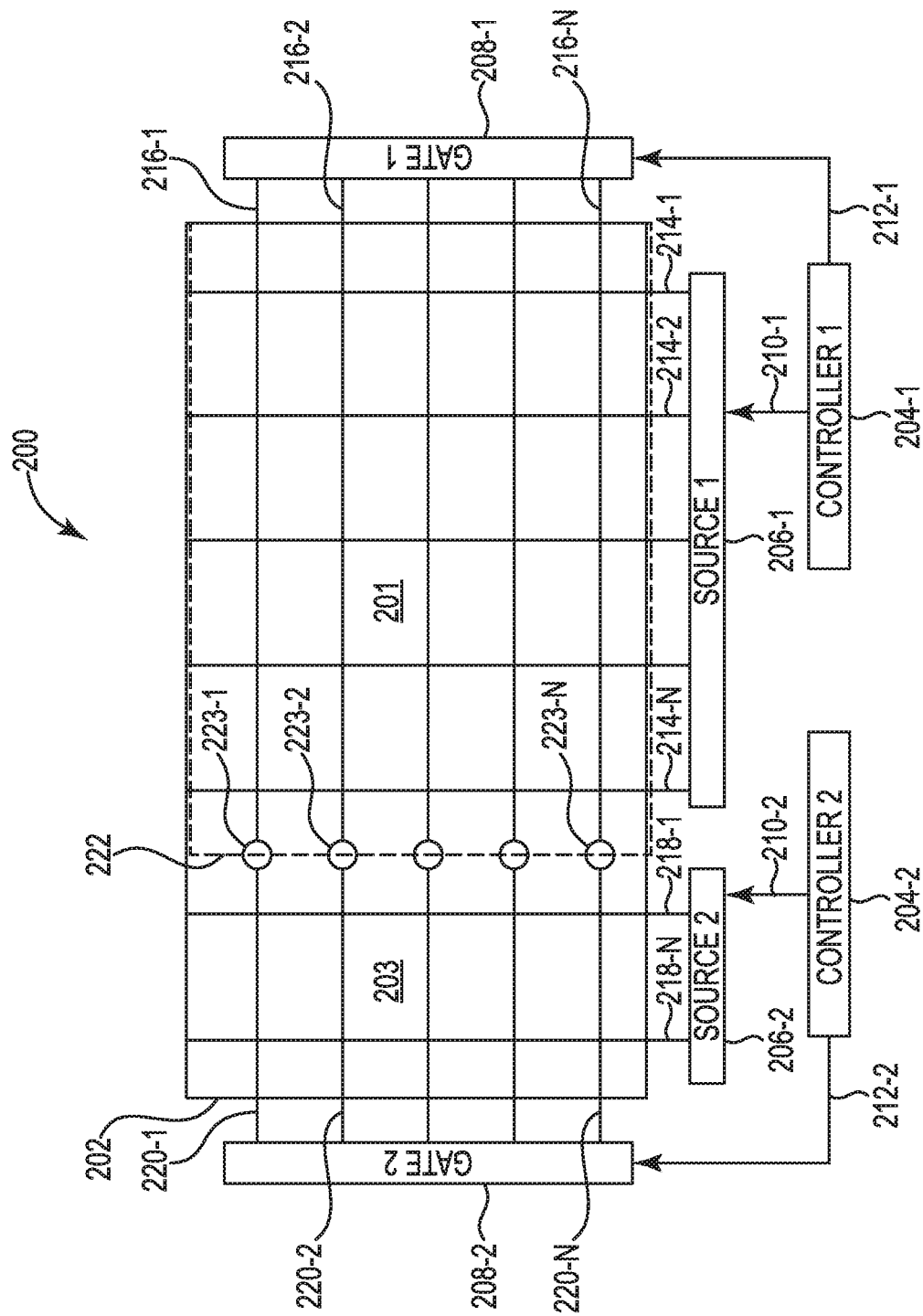
FIG. 2 illustrates an example of a system for a gate line break display consistent with the present disclosure.

FIG. 2 illustrates an example of a system 200 for a gate line break display consistent with the present disclosure. In some examples, the system 200 can include similar elements as system 100. For example, the system 200 can be a display 202 that includes a first source driver 206-1 coupled to a first plurality of source lines 214-1, 214-2, 214-N and a second source driver 206-2 coupled to a second plurality of source lines 218-1, 218-N. In addition, the display 202 can include a first gate driver 208-1 coupled to a first plurality of gate lines 216-1, 216-2, 216-N and a second gate driver 208-2 coupled to a second plurality of gate lines 220-1, 220-2, 220-N.

As described herein, the display 202 can include a first side 201 and a second side 203 that can be separated by a gate line break 222. As described herein, the gate line break 222 can include a plurality of break points 223-1, 223-2, 223-N. As used herein, the plurality of break points 223-1, 223-2, 223-N can be disconnected portions of a gate line between a first source line and a second source line. For example, a signal provided to gate line 216-1 by the gate driver 208-1 can be prevented from passing the break point 223-1 of the gate line break 222. In this example, a signal provided to gate line 220-1 by the gate driver 208-2 can be prevented from passing the break point 223-1 of the gate line break 222. In this way, a signal provided by the gate driver 208-1 will not interfere with a signal provided by the gate driver 208-2.

In some examples, the system 200 can include a first controller 204-1 that is coupled to a first source driver 206-1 via a connection 210-1 and a first gate driver 208-1 via a connection 212-1. In some examples, the first controller 204-1 can provide instructions to the first source driver 206-1 and the first gate driver 208-1. For example, the first controller 204-1 can provide instructions to the first source driver 206-1 that include instructions for a signal to be provided to each of the source lines 214-1, 214-2, 214-N. In another example, the first controller 204-1 can provide instructions to the first gate driver 208-1 that include instructions for a signal to be provided to each of the gate lines 216-1, 216-2, 216-N.

As described herein, a signal from a source line can intersect a signal from a gate line to generate a corresponding color and/or brightness at a pixel positioned at the intersection between the signal line and the gate line. For example, the first controller 204-1 can provide instructions to the gate driver 208-1 to generate a particular signal on the gate line 216-2. In this example, the first controller 204-1 can provide instructions to the source driver 206-1 to generate a particular signal on the source line 214-2. In this example, a pixel can be positioned at an intersection of the gate line 216-2 and the source line 214-2. In this example, the color and/or brightness of the pixel can be altered based on the particular signal of the gate line 216-2 and the particular signal of the source line 214-2. Thus, in some examples, the first controller 204-1 can be utilized to control a functionality of the first side 201 of the display 202.

In some examples, the second controller 204-2 can provide instructions to the gate driver 208-2 to generate a particular signal on gate line 220-2 and provide instructions to the source driver 206-2 to generate a particular signal on source line 218-1. As described herein, a pixel of the display 202 can be positioned at the intersection of the gate line 220-2 and the source line 218-1. As described herein, the signal of on the gate line 220-2 and the source line 218-1 at the intersection can provide a corresponding brightness and/or color of the pixel positioned at the intersection. Thus, in some examples, the second controller 204-1 can be utilized to control the functionality of the second side 203 of the display 202.

In some examples, the first controller 204-1 and the second controller 204-2 can be synchronized controllers. As used herein, synchronized controllers can be controllers that are operating at a synchronized frequency. For example, the first controller 204-1 can provide instructions to the gate driver 208-1 and the source driver 206-1 on the same frequency as the second controller 204-2 provides instructions to the gate driver 208-2 and the source driver 206-2. In this example, the first controller 204-1 and the second controller 204-2 can be synchronized to start at the same time such that the instructions are provided at the same time such that the first side 201 and the second side 203 can operate as a single display. For example, the first controller 204-1 and the second controller 204-2 can be synchronized when the first side 201 and the second side 203 of the display 202 are utilized as a single display. In this example, the first side 201 and the second side 203 of the display can display a complete image or video across the gate line break 222 such that a complete borderless image or video can be displayed on the display 202.

In some examples, the system 200 can be utilized to alter an aspect ratio of the display 202. For example, the system can alter the aspect ratio of the display by activating or deactivating the second side 203 of the display 202. For example, the first controller 204-1 and the second controller 204-2 can provide an aspect ratio of 16:9 when the second controller 204-2, the second gate driver 208-2, and the second source driver 206-2 are activated. In this example, the system 200 can provide an aspect ratio of 3:2 when the second controller 204-2, second gate driver 208-2, and the second source driver 206-2 are deactivated. In this example, the gate line break 222 can be positioned between source line 218-1 and source line 214-N.

In some examples, the first side 201 and the second side 203 of the display 202 be split and controlled separately as distinct displays without having a border between the first side 201 and the second side 203. For example, the display 202 can operate as a first display on the first side 201 controlled by the first controller 204-1 and a second display on the second side 203 controlled by the second controller 204-2 with a borderless presentation between the first side 201 and the second side 203. In this example, the display 202 can provide a better presentation across the first side 201 and the second side 203 than two separate displays and also provide separately controlled displays when the first side 201 and the second side 203 are used as separate displays. In some examples, the first controller 204-1 and the second controller 204-2 can be synchronous or asynchronous when the first side 201 and the second side 203 are used as separate displays.

Figure 3:
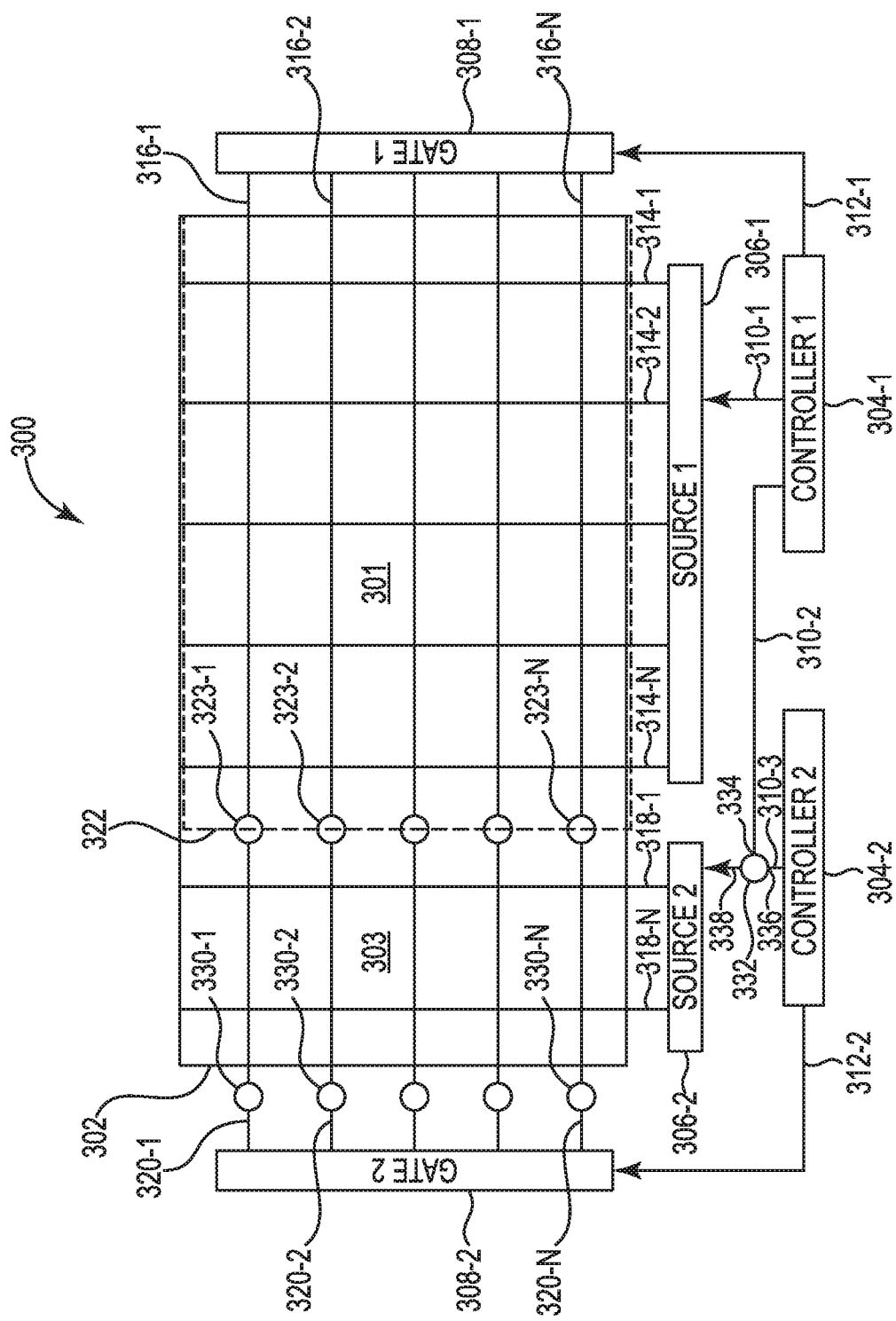
FIG. 3 illustrates an example of a system for a gate line break display consistent with the present disclosure.

FIG. 3 illustrates an example of a system 300 for a gate line break display consistent with the present disclosure. In some examples, the system 300 can include similar elements as system 100 as referenced in FIG. 1 and/or system 200 as referenced in FIG. 2. For example, the system 300 can include a display 302 that includes a gate line break 322 to separate the display into a first side 301 and a second side 303.

In some examples, the system 300 can include a first controller 304-1 that is coupled to a first source driver 306-1 via a connection 310-1 and a first gate driver 308-1 via a connection 312-1. In some examples, the first controller 304-1 can provide instructions to the first source driver 306-1 and the first gate driver 308-1. For example, the first controller 304-1 can provide instructions to the first source driver 306-1 that include instructions for a signal to be provided to each of the source lines 314-1, 314-2, 314-N. In another example, the first controller 304-1 can provide instructions to the first gate driver 308-1 that include instructions for a signal to be provided to each of the gate lines 316-1, 316-2, 316-N.

As described herein, a signal from a source line can intersect a signal from a gate line to generate a corresponding color and/or brightness at a pixel positioned at the intersection between the signal line and the gate line. For example, the first controller 304-1 can provide instructions to the gate driver 308-1 to generate a particular signal on the gate line 316-2. In this example, the first controller 304-1 can provide instructions to the source driver 306-1 to generate a particular signal on the source line 314-2. In this example, a pixel can be positioned at an intersection of the gate line 316-2 and the source line 314-2. In this example, the color and/or brightness of the pixel can be altered based on the particular signal of the gate line 316-2 and the particular signal of the source line 314-2. Thus, in some examples, the first controller 304-1 can be utilized to control a functionality of the first side 301 of the display 302.

In one example, the second controller 304-2 can provide instructions to the gate driver 308-2 to generate a particular signal on gate line 320-2 and provide instructions to the source driver 306-2 to generate a particular signal on source line 318-1. As described herein, a pixel of the display 302 can be positioned at the intersection of the gate line 320-2 and the source line 318-1, As described herein, the signal of on the gate line 320-2 and the source line 318-1 at the intersection can provide a corresponding brightness and/or color of the pixel positioned at the intersection. Thus, in some examples, the second controller 304-1 can be utilized to control the functionality of the second side 303 of the display 302.

As described herein the gate line break 322 can include a plurality of break points 323-1, 323-2, 323-N. In some examples, the plurality of break points 323-1, 323-2, 323-N can include a plurality of corresponding switches that can be utilized to connect or disconnect the plurality of gate lines 316-1, 316-2, 316-N from the plurality of gate lines 320-1, 320-2, 320-N. For example, the break point 323-1 can include a switch that can be opened to create a disconnected portion between gate line 316-1 and gate line 320-1, In this example, the switch at the break point 323-1 can be closed to create a connection between gate line 316-1 and gate line 320-1. As used herein, a switch that is closed can enable a signal to pass through the switch and complete a connection between a first gate line and a second gate line. As used herein, a switch that is open can prevent a signal from passing through the switch and prevent a connection between a first gate line and a second gate line.

In some examples, the gate driver 308-2 can be coupled to the plurality of gate lines 320-1, 320-2, 320-N by a plurality of corresponding switches 330-1, 330-2, 330-N. For example, the gate driver 308-2 can be coupled to switch 330-1. In this example, the switch 330-1 can be coupled to the gate line 320-1. In this example, the plurality of switches 330-1, 330-2, 330-N can be utilized to connect or disconnect the gate driver 308-2 from the plurality of switches 330-1, 330-2, 330-N. For example, the plurality of switches 330-1, 330-2, 330-N can be opened to create a disconnected portion between the gate driver 308-2 and the plurality of gate lines 320-1, 320-2, 320-N, In another example, the plurality of switches 330-1, 330-2, 330-N can be closed to complete a connection between the gate driver 308-2 and the plurality of gate lines 320-1, 320-2, 320-N. In some examples, the plurality of switches 330-1, 330-2, 330-N can be utilized to connect or disconnect the plurality of gate lines 320-1, 320-2, 320-N from the gate driver 308-2.

In some examples, the first controller 304-1 and the second controller 304-2 can be coupled to a switch 332. For example, the first controller 304-1 can be coupled to a first input 334 of the switch 332 via a connection 310-2 and the second controller 304-2 can be coupled to a second input 336 of the switch 332 via a connection 310-3. In some examples, the switch 332 can be coupled to the second source driver 306-2. For example, an output 338 of the switch 332 can be coupled to the second source driver 306-2 via a connection 338.

In some examples, the switch 332 can switch between a first input 334 and a second input 336. In some examples, the switch 332 can be utilized to switch the controller providing instructions to the second source driver 306-2. In some examples, the switch 332 can be utilized to switch between the first controller 304-1 coupled to the first input 334 and the second controller 304-2 coupled to the second input 336.

For example, the switch 332 can close or complete a connection between the first input 334 and the output 338 to provide a connection between the first controller 304-1 and the second source driver 306-2. In this example, the switch 332 can open or disconnect a connection between the second input 336 and the output 338 to disconnect a connection between the second controller 304-2 and the second driver 306-2. In this example, the first controller 304-1 can control the functionality of the first source driver 306-1 and the second source driver 306-2. In another example, the switch 332 can close or complete a connection between the second input 336 and the output 338 to provide a connection between the second controller 304-2 and the second source driver 306-2. In this example, the switch 332 can open or disconnect a connection between the first controller 304-1 and the second driver 306-2. In this example, the second controller 304-2 can control the functionality of the second source driver 306-2 while the first controller 304-1 can control the functionality of the first source driver 306-1 via connection 310-1.

In some examples, the first side 301 and the second side 303 of the display 302 can be utilized as a single display when the switch 332 is closed or completing a connection between the first input 334 and the output 338 to complete a connection between the first controller 304-1 and the second source driver. In these examples, the plurality of switches 330-1, 330-2, 330-N can be opened to disconnect the second gate driver 308-2 from the plurality of gate lines 320-1. In these examples, the plurality of switches 323-1, 323-2, 323-N can be closed or completing a connection between the plurality of gate lines 316-1, 316-2, 316-N and gate lines 320-1, 320-2, 320-N. In these examples, the first controller 304-1 can: provide instructions to the first gate driver 308-1 via connection 312-1, provide instructions to the first source driver 306-1 via connection 310-1, and provide instructions to the second source driver 306-2 via connection 310-2. In these examples, the plurality of switches 330-1, 330-2, 330-N can be opened to prevent the second gate driver 308-2 from sending signals on the gate lines 320-1, 320-2, 320-N that could interfere with the signals being provided by the first gate driver 308-1.

In some examples, the system 300 can be utilized to alter an aspect ratio of the display 302. For example, the system 300 can alter the aspect ratio of the display 302 by opening the plurality of switches 323-1, 323-2, 323-N, closing the plurality of switches 330-1, 330-2, 330-N, and altering the switch 334 to close a connection between the input 336 and the output 338. In this example, the first controller 304-1 can control a functionality of the first side 301 by providing instructions to the first gate driver 308-1 and providing instructions to the first source driver 306-1 while the second controller 304-2 controls a functionality of the second side 303 by providing instructions to the second gate driver 308-2 and providing instructions to the second source driver 306-2.

In some examples, the system 300 can alter the aspect ratio of the display by deactivating the second side 303 of the display 302 and/or allowing the second controller 304-2 to control the functionality of the second side 303. For example, the first controller 304-1 can provide an aspect ratio of 16:9 when the first controller 304-2 is coupled to the first source driver 306-1 and the second source driver 306-2 via the switch 332 as described herein. In this example, the system 300 can provide an aspect ratio of 3:2 when the plurality of switches 323-1, 323-2, 323-N are open to disconnect the gate lines 316-1, 316-2, 316-N from the gate lines 320-1, 320-2, 320-N. In this example, the plurality of switches 323-1, 323-2, 323-N can be positioned between source line 318-1 and source line 314-N.

In some examples, the system 300 can provide multiple displays within the display 302. For example, the first side 301 can be a first display controlled by the first controller 304-1 and the second side 303 can be a second display controlled by the second controller 304-2. In some examples, the first side 301 and the second side 303 can be separated between a first source line and a second source line. For example, the first side 301 and the second side 303 of the display 302 can be separated between source line 314-N and source line 318-1. Thus, the border between the first side 301 and the second side 303 can be a distance between the first source line and the second source line or a distance between pixels positioned on the first source lines and pixels positioned on the second source line.

In some examples, the first side 301 and the second side 303 of the display 302 can be split and controlled separately as distinct displays without having a border between the first side 301 and the second side 303. For example, the display 302 can operate as a first display on the first side 301 controlled by the first controller 304-1 and a second display on the second side 303 controlled by the second controller 304-2 with a borderless presentation between the first side 301 and the second side 303. In this example, the display 302 can provide a better presentation across the first side 301 and the second side 303 than two separate displays and also provide separately controlled displays when the first side 301 and the second side 303 are used as separate displays.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A display device, comprising:
a gate line break across a plurality of gate lines;
a first source driver positioned on a first side of the gate line break;
a first gate driver positioned on the first side of the gate line break;
a second source driver positioned on a second side of the gate line break;
a second gate driver positioned on the second side of the gate line break; and
a controller to:
open the gate line break;
activate the first source driver and first gate driver to activate a first portion of the display device on the first side of the gate line break; and
deactivate the second source driver and second gate driver to deactivate a second portion of the display device on the second side of the gate line break.

2. The display of claim 1, wherein the gate line break includes a disconnected portion on a gate line between a first source line and a second source line.

3. The display of claim 2, wherein the first source line is coupled to the first source driver and the second source line is coupled to the second source driver.

4. The display of claim 1, wherein the controller is coupled to the first source driver, the first gate driver, the second source driver and the second gate driver.

5. The display of claim 1, wherein the controller is to:
close the gate line break; and
activate the second source driver and second gate driver to activate the second portion of the display device on the second side of the gate line break to provide an aspect ratio that includes the first portion of the display and the second portion of the display.

6. A system comprising:
a display that includes a plurality of source lines and a plurality of gate lines, wherein the plurality of source lines and the plurality of gate lines intersect at a plurality of intersection points;
a gate line break that includes a first plurality of switches positioned on the plurality of gate lines between a first source line and a second source line;
a first gate driver and a first source driver coupled to a first side of the gate line break;
a second gate driver and a second source driver coupled to a second side of the gate line break, wherein a second plurality of switches are coupled between the second gate driver and the plurality of gate lines on the second side of the gate line break;
a first controller coupled to the first gate driver and the first source driver;
a second controller coupled to the second gate driver and a third switch; and
the third switch coupled to the second source driver and the first controller.

7. The system of claim 6, wherein first side and the second side of the gate line break operate as a single display when the first plurality of switches are closed, the second plurality of switches are open, and the third switch is closed to the first controller.

8. The system of claim 7, wherein the first controller controls a functionality of the first source driver, the second source driver, and the first gate driver when the first side and the second side of the gate line break operate as a single display.

9. The system of claim 6, wherein the first side and the second side of the gate line break operate as separate displays when the first plurality of switches are open, the second plurality of switches are closed, and the third switch is closed to the second controller.

10. The system of claim 9, wherein:
the first controller controls a functionality of the first source driver and the first gate driver; and
the second controller controls a functionality of the second source driver and the second gate driver when the first side and the second side of the gate line break operate as separate displays.

11. The system of claim 6, wherein the first side of the gate line break has a first aspect ratio and the second side of the gate line break has a second aspect ratio that is different than the first aspect ratio.

12. A display device, comprising:
a plurality of source lines and a plurality of gate lines that intersect the plurality of source lines at corresponding intersection points;
a gate line break that includes a switch on each of the plurality of gate lines positioned between a first source line and a second source line of the plurality of source lines;
a first source driver coupled to a first portion of the plurality of source lines on a first side of the gate line break;
a second source driver coupled to a second portion of the plurality of source lines on a second side of the gate line break;

a first gate driver coupled to a first portion of the plurality of gate lines on a first side of the gate line break;
a second gate driver coupled to a second portion of the plurality of gate lines on a second side of the gate line break via a plurality of corresponding switches; and
a controller to:
   close the gate line break;
   activate the first source driver, the second source driver, and the first gate driver to activate a first portion of the display device on the first side of the gate line break and a second portion of the display device on the second side of the gate line break; and
   open the plurality of corresponding switches to deactivate the second gate driver.

13. The display of claim 12, wherein the corresponding intersection points correspond to a location of a pixel of the display device.

14. The display of claim 12, wherein the controller is to alter an aspect ratio of the display device by altering a state of the gate line break switches and altering a state of the corresponding switches.

* * * * *